(12) United States Patent
Wagner et al.

(10) Patent No.: US 8,088,200 B2
(45) Date of Patent: Jan. 3, 2012

(54) METHOD FOR REMOVING ACID GASES FROM A FLUID STREAM

(75) Inventors: Rupert Wagner, Worms (DE); Randolf Hugo, Dirmstein (DE)

(73) Assignee: BASF SE, Ludwigshafen (DE)

( * ) Notice: Subject to any disclaimer, the term of this patent is extended or adjusted under 35 U.S.C. 154(b) by 660 days.

(21) Appl. No.: 12/278,471

(22) PCT Filed: Feb. 14, 2007

(86) PCT No.: PCT/EP2007/051436
§ 371 (c)(1),
(2), (4) Date: Nov. 4, 2008

(87) PCT Pub. No.: WO2007/093615
PCT Pub. Date: Aug. 23, 2007

(65) Prior Publication Data
US 2009/0158930 A1    Jun. 25, 2009

(30) Foreign Application Priority Data
Feb. 14, 2006  (EP) .................................. 06002962

(51) Int. Cl.
*B01D 53/14* (2006.01)
(52) U.S. Cl. ............. 95/179; 95/181; 95/183; 95/193; 95/194; 95/209; 95/227; 95/228; 95/235; 95/236; 96/234; 96/242; 423/228; 423/229
(58) Field of Classification Search .......... 95/172–173, 95/181, 183, 192–193, 199, 208–209, 235–236, 95/179; 423/220, 228–229; 96/234, 242
See application file for complete search history.

(56) References Cited

U.S. PATENT DOCUMENTS

| | | | | |
|---|---|---|---|---|
| 2,368,595 A | * | 1/1945 | Johnson | 423/220 |
| 4,035,166 A | * | 7/1977 | Van Hecke | 95/163 |
| 4,073,863 A | * | 2/1978 | Giammarco et al. | 423/222 |
| 4,146,569 A | * | 3/1979 | Giammarco et al. | 423/222 |
| 4,198,378 A | * | 4/1980 | Giammarco et al. | 423/220 |

(Continued)

FOREIGN PATENT DOCUMENTS

CA        1088472 A    6/1994

(Continued)

*Primary Examiner* — Duane Smith
*Assistant Examiner* — Ives Wu
(74) *Attorney, Agent, or Firm* — Connolly Bove Lodge & Hutz LLP

(57) ABSTRACT

In a method for removing acid gases from a fluid stream, the fluid stream, which is in contact with an absorption medium within an absorber, is passed through a first absorption zone in the absorber to remove a majority of acid gases from the fluid stream. The fluid stream is susequently passed through a second absorption zone in the absorber to further remove acid gases from the fluid stream. The loaded absorption medium is passed into a first regeneration zone to obtain a partially regenerated absorption medium, and a part of the partially regenerated absorption medium is passed into the first absorption zone. The other part of the partially regenerated absorption medium is passed into a second regeneration zone to obtain a regenerated absorption medium. A part of the regenerated absorption medium is passed into the first absorption zone and the other part is passed into the second absorption zone.

24 Claims, 2 Drawing Sheets

U.S. PATENT DOCUMENTS

Figure 1:
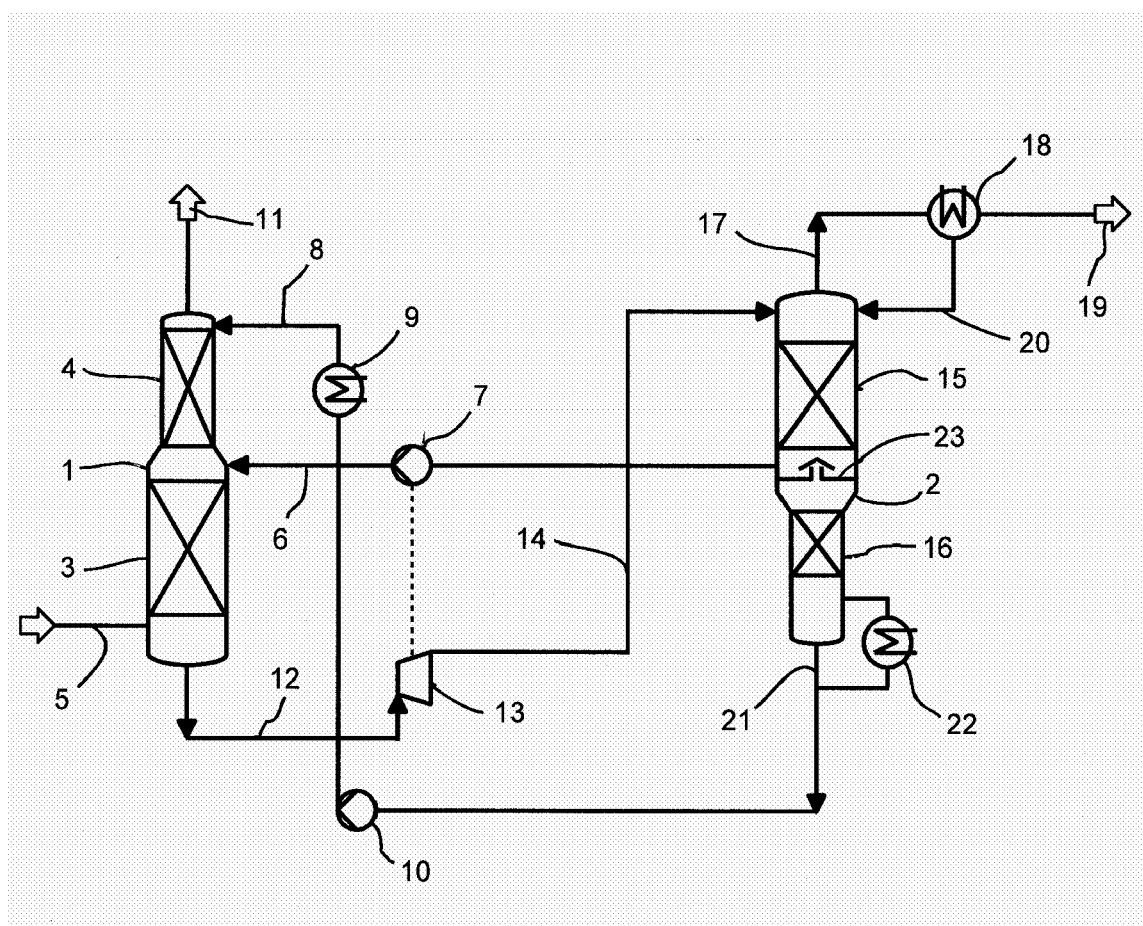

| | | | | |
|---|---|---|---|---|
| 4,336,233 A | * | 6/1982 | Appl et al. | 423/228 |
| 4,853,012 A | | 8/1989 | Batteux et al. | |
| 6,165,432 A | * | 12/2000 | Rooney | 423/228 |
| 7,666,813 B2 | * | 2/2010 | Hoefer et al. | 502/401 |
| 2006/0156923 A1 | * | 7/2006 | Meckl et al. | 95/236 |

FOREIGN PATENT DOCUMENTS

| | | |
|---|---|---|
| DE | 10334002 A1 | 2/2005 |
| EP | 2195916 A * | 4/1988 |
| GB | 2196916 | 4/1988 |

* cited by examiner

METHOD FOR REMOVING ACID GASES FROM A FLUID STREAM

Priority is claimed as a national stage application under 35 U.S.C. §371 to PCT/EP2007051436, filed Feb. 14, 2007, which claims priority to European application 06002962.6, filed Feb. 14, 2006. The aforementioned priority documents are incorporated herein by reference in their entirety.

DESCRIPTION

The present invention relates to a method for removing acid gases from a fluid stream and a method for converting a plant for removing acid gases from a fluid stream.

In numerous processes in the chemical industry fluid streams occur which comprise acid gases such as, for example, $CO_2$, $H_2S$, $SO_2$, $CS_2$, HCN, COS or mercaptans. These fluid streams can be, for example, gas streams such as natural gas, refinery gas, synthesis gas, flue gases or reaction gases formed in the composting of waste materials comprising organic substances.

The removal of acid gases is of particular importance for different reasons. The elements nitrogen and hydrogen form the foundation of ammonia synthesis by the Haber-Bosch process. Hydrogen is currently predominantly obtained by steam reforming of natural gas. At 700 to 900° C., the natural gas is reacted with steam to form hydrogen and carbon monoxide in a reformer, after prior desulfurization, in the presence of a nickel oxide-aluminum oxide catalyst. The carbon monoxide formed is reacted with steam to give hydrogen and carbon dioxide in the presence of a copper(II) oxide-zinc oxide catalyst. The carbon dioxide is then removed, which produces pure hydrogen.

The sulfur compound content of natural gas must be reduced immediately at the natural gas source by suitable treatment measures, since the sulfur compounds also form acids in the water frequently entrained by the natural gas, which act corrosively. For transporting the natural gas in a pipeline, preset limit values of the sulfurous impurities must therefore be met. The reaction gases formed in the oxidation of organic materials, such as, for example, organic wastes, coal, or mineral oil, or in the composting of waste materials comprising organic substances, must be removed in order to prevent the emission of gases which damage the natural environment or can affect the climate.

For the removal of acid gases, use is made of scrubbing using solutions of inorganic or organic bases. On dissolving acid gases in the absorption medium, ions form with the bases. The absorption medium can be regenerated by expansion to a lower pressure or by stripping, the ionic species reacting back to form acid gases and/or being stripped off by means of steam. After the regeneration process the absorption medium can be reused.

In the method known as the Benfield process or "hot pot" process, hot potash solution (potassium carbonate) is used as absorption medium. The removal of carbon dioxide is based on the following equation:

The removal of hydrogen sulfide can be represented by the following equation:

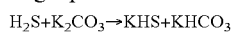

Potassium carbonate has a limited solubility in water; the aqueous potash solution must therefore be kept at a high temperature to prevent the salt from precipitating out. The name "hot pot" indicates the high temperature at which the method is customarily carried out.

The absorption rate in potassium carbonate solutions is limited by the rate of reaction between the carbon dioxide and the hydroxide ion. In order to circumvent the requirement for long contact times and high absorption towers, use is made of various activators to accelerate this reaction. These activators are usually primary or secondary amines whose role is to accelerate the formation of the hydrogencarbonate ion by intermediate formation of a carbamate ion.

Carbamates are highly corrosive. In the case of the hot pot process, this circumstance is further increased by the high temperatures at which the method is carried out. Therefore, most plants which operate by the hot pot method are subject to considerable corrosion of the plant parts fabricated from steel. Attempts are made to suppress the corrosion by adding corrosion inhibitors such as arsenic compounds or potassium metavanadate. Although these corrosion inhibitors can effectively passivate the metal surfaces, these arsenic compounds or vanadium compounds are highly toxic and are a serious environmental hazard in the event of escape of the absorption medium. In addition, the time-consuming passivation which is required must be carried out again after each operational shutdown.

The amine activators, in addition, are not particularly stable in the hot potassium carbonate solution. Decomposition products of the amines frequently reinforce the corrosiveness of the absorption medium. In addition, deposits of the decomposition products have been found which block the piping and column bottoms. The decomposition products, in addition, lead to foaming of the absorption medium.

In addition to the hot pot process, methods are known for removing acid gases from fluid streams in which, as absorption medium, use is made of aqueous solutions of organic bases, for example alkanolamines (hereinafter: "amine methods").

Most hot pot plants were constructed in the 1970s and no longer meet the latest standards of economic efficiency. The energy consumption of these plants is significantly higher than that of plants which make use of aqueous amine solutions. The energy consumption of $CO_2$ removal is, in some applications, for example in the context of ammonia synthesis, a critical point which decides the economic viability of the overall method.

Therefore the desire exists to convert existing plants which operate by a hot pot process to an amine method.

There are essential features in common between the hot pot process and a method for acid gas removal by means of aqueous amine solutions. In both methods, the fluid stream to be treated is brought into intimate contact with the absorption medium in an absorber. The loaded absorption medium (rich solvent) is regenerated in a stripper. Most hot pot plants operate according to a two-stage method. A relatively small part of the regenerated absorption medium (lean solvent) is fed in at the top of the absorber and a relatively large part of the only partially regenerated absorption medium (semi-lean solvent) is fed into the center of the absorber. The majority of the acid gases is removed in the circuit of the partially regenerated absorption medium (semi-lean loop) and only the polishing is performed using the regenerated absorption medium. Since the upper part of the absorber is subject to a lower hydraulic loading, the cross section of the upper part of the absorber is usually smaller than that of the lower part.

The regeneration column typically comprises an upper part (expansion column) having a large number of separation stages in which the loaded absorption medium is partially regenerated by expansion (flashing), and a (smaller) lower part in which a smaller part of the absorption medium is thermally regenerated by direct or indirect heating. The cross section of the lower part of the regeneration column is usually smaller than that of the upper part. The vapor from the lower part of the regeneration column also flows through the upper part of the column and, owing to its heating action, improves the efficiency of the flash regeneration taking place there.

In the hot pot process, absorption and regeneration proceed at essentially the same temperature. Internal heat recovery by heat transfer between loaded absorption medium and regenerated absorption medium is therefore not possible. An essential feature of an amine method is that absorption and regeneration not only proceed at different pressures, but also at different temperatures. Generally, therefore, in amine methods a heat exchanger is provided for heating the loaded absorption medium by indirect heat exchange with the regenerated absorption medium (lean/rich solvent heat exchanger).

The main differences between a plant which operates according to the two-stage hot pot method and an optimized two-stage amine method are.
(i) the absorption medium circulation rate in the hot pot method is lower overall than in an amine method;
(ii) the specific energy consumption for hot pot absorption media is higher;
(iii) the reflux condenser in hot pot plants is considerably larger, the cooler for the regenerated absorption medium is considerably smaller than in amine plants;
(iv) hot pot plants customarily do not have a heat exchanger for heating the loaded absorption medium by indirect heat exchange with the regenerated absorption medium (lean/rich solvent heat exchanger);
(v) hot pot plants customarily have an expansion column (for partial absorption medium regeneration) having a large number of separation stages.

The proportionately averaged acid gas absorption capacity of the partially regenerated absorption medium and of the regenerated absorption medium per cycle is higher in a hot pot method than for an absorption medium based on aqueous amine solutions. In order to achieve the same overall absorption capacity, when an amine absorption medium is used the absorption medium circulation rate would have to be increased. This generally fails owing to the fact that increasing the circulation rate would lead to a hydraulic overloading of the absorber and/or of the regeneration column, which generally cannot be remediated either by an (in addition expensive) exchange or by optimization of the packings in the columns.

Conversion to an amine method only appears logical when the essential plant components, in particular the absorber and the expansion column, can continue to be used, and furthermore only restricted modifications and/or supplementation to apparatus are required. Obviously, the acid-gas-specific energy consumption after conversion must not be higher than in the original hot pot process, since the energy saving, in addition to the lower corrosiveness, is the main advantage of the amine method.

The object was therefore to provide an amine method which can be carried out on a hot pot plant with few changes to apparatus, the energy requirement for the same output being no higher than in the hot pot process.

The object is achieved by a method for removing acid gases from a fluid stream in which
a) the fluid stream, in contact with an absorption medium which comprises an aqueous solution of at least one amine, is passed through a first absorption zone in an absorber, the majority of the acid gases being removed, and the fluid stream is passed through a second absorption zone in the absorber, a further amount of the acid gases being removed,
b) the loaded absorption medium is passed into a first regeneration zone, a partially regenerated absorption medium being obtained, and a part of the partially regenerated absorption medium is passed into the first absorption zone,
c) the other part of the partially regenerated absorption medium is passed into a second regeneration zone, a regenerated absorption medium being obtained, and
d) a part of the regenerated absorption medium is passed into the first absorption zone and the other part of the regenerated absorption medium is passed into the second absorption zone.

The ratio of the circulation rate of the partially regenerated absorption medium to that of the regenerated absorption medium (semi-lean/lean ratio) in the method according to the invention is typically 0.5 to 3, preferably 0.7 to 2, particularly preferably 0.8 to 1.5. The ratio of regenerated absorption medium to partially regenerated absorption medium is higher than in a conventional, that is to say energetically optimized, amine method.

In the method according to the invention, the regenerated absorption medium is not introduced, as in a conventional amine method, completely at the top of the absorber, that is to say into the second absorption zone, but a part of the regenerated absorption medium is passed into the first absorption zone and thus increases the absorption performance in the first absorption zone.

It has not been found to be expedient to introduce the entire amount of the regenerated absorption medium at the top of the absorber, that is to say into the second absorption zone, since this leads to the hydraulic overloading of the upper part of the absorber, especially as this, as described above, generally has a smaller cross section than the lower part of the absorber. Typically, the regenerated absorption medium is apportioned between the first absorption zone and second absorption zone in a ratio of 1:1 to 5:1, preferably 2:1 to 4:1, particularly preferably 2.4:1 to 3:1.

The partially regenerated absorption medium generally has a degree of loading of 50 to 70% and the regenerated absorption medium has a degree of loading of 2 to 6%. The degree of loading is defined as loading (for example in mole of acid gas per mole of amine) based on the loading of the loaded absorption medium (that is to say of the absorption medium at the absorber bottom).

To lower the energy consumption of the method by partial internal heat recovery, expediently the partially regenerated absorption medium passed from the first regeneration zone into the second regeneration zone is preheated by indirect heat exchange with the regenerated absorption medium exiting from the second regeneration zone.

The overall pressure in the absorption step is generally about 10 to 100 bar, preferably about 20 to 80 bar, particularly preferably 25 to 70 bar.

The temperature in the first absorption zone is generally 40 to 100° C., preferably 50 to 90° C., and in particular 60 to 90° C.; the temperature in the second absorption zone is 30 to 90° C., preferably 40 to 80° C., and in particular 40 to 70° C. The temperature is 5 to 20° C. lower than in the first absorption stage.

The regenerated absorption medium entering the first absorption zone preferably has a temperature of 35 to 70° C., in particular 40 to 60° C. To set the required temperatures, the regenerated absorption medium is passed through a heat exchanger of appropriate performance.

The regenerated absorption medium entering the second absorption zone, that is to say the top of the absorber, preferably has a temperature of 30 to 60° C., in particular 40 to 50° C. To set these temperatures, this substream of the regenerated absorption medium is if appropriate passed through a further heat exchanger of suitable performance.

Suitable absorber columns are, for example, packed-bed columns, ordered-packing columns and tray columns. In tray columns, sieve trays, bubble-cap trays or valve trays are installed, over which the liquid flows. The vapor is passed through special slots or holes so that a spouted bed is formed. On each of these trays, a new equilibrium is established. Packed-bed columns can be packed with different shaped bodies. Heat exchange and mass transfer are improved by increasing the surface area because of the shaped bodies that are usually about 25 to 80 mm in size. Known examples are the Raschig ring (a hollow cylinder), Pall ring, Hiflow ring, Intalox saddle and the like. The packed beds can be introduced into the column in an ordered manner, or else randomly (as a bed). Materials which come into consideration are glass, ceramic, metal and plastics. Structured packings are a further development of ordered packings. They have a regularly shaped structure. As a result, it is possible with ordered packings to reduce pressure drops in the gas stream. There are various designs of packings, for example, woven packings or sheet metal packings. As material, use can be made of metal, plastic, glass and ceramic. Generally, the absorber of a hot pot plant, however, can be used without significant changes.

The regeneration column can likewise be a packed-bed column, ordered-packing column or tray column. The regeneration column, at the bottom, has a heater, for example a forced circulation evaporator with circulation pump. At the top, the regeneration column has an outlet for the released acid gases. Entrained absorption medium vapors are condensed in a condenser and recirculated to the column. In the first regeneration zone the loaded absorption medium is partially regenerated by expansion and stripping, in the second regeneration zone a smaller part of the absorption medium is thermally regenerated by direct or indirect heating. The first and second regeneration zones are customarily separated from one another by a liquid collection tray. On the collection tray partially regenerated absorption medium backs up, which can be taken off.

The pressure at the top of the regeneration column is generally about 1 to 5 bar, preferably about 1.2 to 2 bar. Apart from the pressure drop occurring, the pressure in the first and second regeneration zones is generally essentially the same.

In the case of a regeneration column operated at about 1.2 bar top pressure, the temperature in the first regeneration zone is generally 65 to 85° C., preferably 70 to 80° C.; the temperature in the second regeneration zone is 95 to 120° C. At a higher pressure in the regeneration column, the stated temperatures increase in accordance with the vapor pressure curve of the absorption medium, at lower pressure, they decrease. Generally, the temperature in the second regeneration zone is 15 to 35° C. higher than in the first regeneration zone.

The first regeneration zone is customarily arranged above the second regeneration zone in the regeneration column and the first regeneration zone is heated exclusively by ascending vapors from the second regeneration zone. As mentioned, hot pot plants customarily have an expansion column having a great number of separation stages. Expediently, the existing expansion column continues to be used, in that a collection tray is inserted into the expansion column and thus divides it into a first regeneration zone and a second regeneration zone. The collection tray is, for example, a chimney tray.

The invention therefore also relates to a method for converting a plant for removing acid gases from a fluid stream, the plant comprising
(i) an absorber having a first absorption zone and a second absorption zone,
(ii) a regeneration column having an upper part constructed as expansion column and a lower part,
(iii) a line for regenerated absorption medium from the bottom of the regeneration column to the second absorption zone,
(iv) a line for partially regenerated absorption medium from the lower end of the expansion column to the first absorption zone and
(v) a line for loaded absorption medium from the bottom of the absorber to the upper end of the expansion column,
in which a collection tray is inserted into the of the expansion column so that it divides the expansion column into a first regeneration zone and a second regeneration zone, and the line for partially regenerated absorption medium leads from the collection tray to the first absorption zone.

Generally, the collection tray is inserted into the expansion column in such a manner that it divides the separation stages of the expansion column lying above the collection tray and the separation stages lying below the collection tray in the ratio 1:10 to 1:3, preferably 1:8 to 1:5. Practical considerations, for example structural circumstances, can justify deviations.

The lower, narrower part of the regeneration column no longer has any function. If appropriate, this part is free from internals, such as, in particular, packings, if a hydraulic overloading of the lower column part must be avoided.

In the course of the conversion, preferably a heat exchanger is also provided to preheat the partially regenerated absorption medium passed from the first regeneration zone to the second regeneration zone by indirect heat exchange with the regenerated absorption medium exiting from the second regeneration zone.

In the course of the conversion, preferably a distributor is provided to apportion the regenerated absorption medium between the first and second absorption zones. Expediently, between the regeneration column and distributor, a cooler is provided for cooling the regenerated absorption medium. This cooler replaces or supplements the existing cooler in the hot pot plant for cooling the regenerated absorption medium entering the second absorption zone.

The fluid stream which is treated in accordance with the method according to the invention is, for example, a synthesis gas, in particular synthesis gas for ammonia production. Alternatively, it can be natural gas, refinery gas or gas streams in chemical or metallurgical processes.

The absorption media used are aqueous solutions of amines having a total amine content of 30 to 70% by weight, in particular 40 to 60% by weight.

Preferably, the absorption medium comprises an aqueous solution of monoethanol-amine (MEA), methylaminopropylamine (MAPA), piperazine, diethanolamine (DEA), triethanolamine (TEA), diethylethanolamine (DEEA), diisopropylamine (DIPA), aminoethoxyethanol (AEE), dimethylaminopropanol (DIMAP) and methyldiethanolamine (MDEA), methyldiisopropanolamine (MDIPA), 2-amino-1-butanol (2-AB) or mixtures thereof.

Preferred absorption media comprise at least one alkanolamine having 4 to 12 carbon atoms. Particularly preferred absorption media comprise at least one tertiary alkanolamine and preferably an activator in the form of a primary or secondary amine. Preferred activators are saturated, 5- to 7-member heterocyclic compounds having at least one NH group and if appropriate a further heteroatom in the ring selected from an oxygen atom and a nitrogen atom. Suitable activators are piperazine, 1-methyl-piperazine, 2-methylpiperazine, 1-aminoethylpiperazine, morpholine, piperidine. Other preferred activators are selected from methylaminopropylamine, 2-amino-1-butanol and aminoethoxyethanol.

The absorption medium described in U.S. Pat. No. 4,336,233 is also very particularly proven. It is an aqueous solution of methyldiethanolamine (MDEA) and piperazine as absorption accelerator or activator (aMDEA®, BASF AG, Ludwigshafen). The wash liquid described there comprises 1.5 to 4.5 mol/l of methyldiethanolamine (MDEA) and 0.05 to 0.8 mol/l, preferably up to 0.4 mol/l of piperazine.

A further suitable absorption medium comprises an aqueous solution of methyldiethanolamine and methylaminopropylamine.

A further suitable absorption medium comprises an aqueous solution of methyldiethanolamine and aminoethoxyethanol.

A further suitable absorption medium comprises an aqueous solution of methyldiethanolamine and 2-amino-1-butanol.

The invention will be described hereinafter on the basis of FIGS. 1 and 2.

FIG. 1 shows diagrammatically the typical structure of a hot pot plant having an absorber 1 and a regeneration column 2. The absorber 1 comprises a first absorption zone 3 in the lower part of the absorber 1 and a second absorption zone 4 in the upper part of the absorber 1. Both absorption zones comprise packed beds or separation trays in order to effect the mass transfer and heat exchange. The fluid stream to be treated is fed via the line 5 into the absorber 1 and, in the first absorption zone 3, passed in countercurrent flow to a partially regenerated absorption medium which is supplied via the line 6 and the pump 7. The fluid stream ascends further into the second absorption zone 4 in which it is passed in countercurrent flow to cooled regenerated absorption medium which is supplied via the line 8, the cooler 9 and the pump 10. The fluid stream freed from acid gases leaves the absorber 1 via the line 11.

The loaded absorption medium leaves the absorber 1 via the line 12. Many of these plants have an expansion turbine 13 in which the loaded absorption medium is expanded at lower pressure. The energy obtained can be used to drive, for example, the pump 7. The loaded absorption medium passes via the line 14 to the regeneration column 2. The regeneration column 2 comprises an upper part 15 in which the majority of the $CO_2$ and $H_2S$ is released by pressure expansion and a lower part 16 which are separated from one another by a collection tray 23. The acid gas released from the absorption medium leaves the regeneration column 2 via the line 17. Entrained absorption medium vapors are condensed in the condenser 18 and recirculated via the line 20 to the regeneration column 2. The acid gas leaves the condenser 18 via the line 19.

Partially regenerated absorption medium which collects on the collection tray 23 is passed back into the absorber 1 via the pump 7 and line 6. A part of the partially regenerated absorption medium enters the lower part 16 of the regeneration column 2 in which it is stripped by ascending vapors and thermally regenerated. The heating of the regeneration column 2 proceeds via absorption medium which is taken off from the bottom of the column via the line 21 and, in the embodiment shown with circulation evaporator, is recirculated via the heater 22 to the regeneration column 2. The regenerated absorption medium passes via the pump 10 back into the absorber 1.

Figure 2:
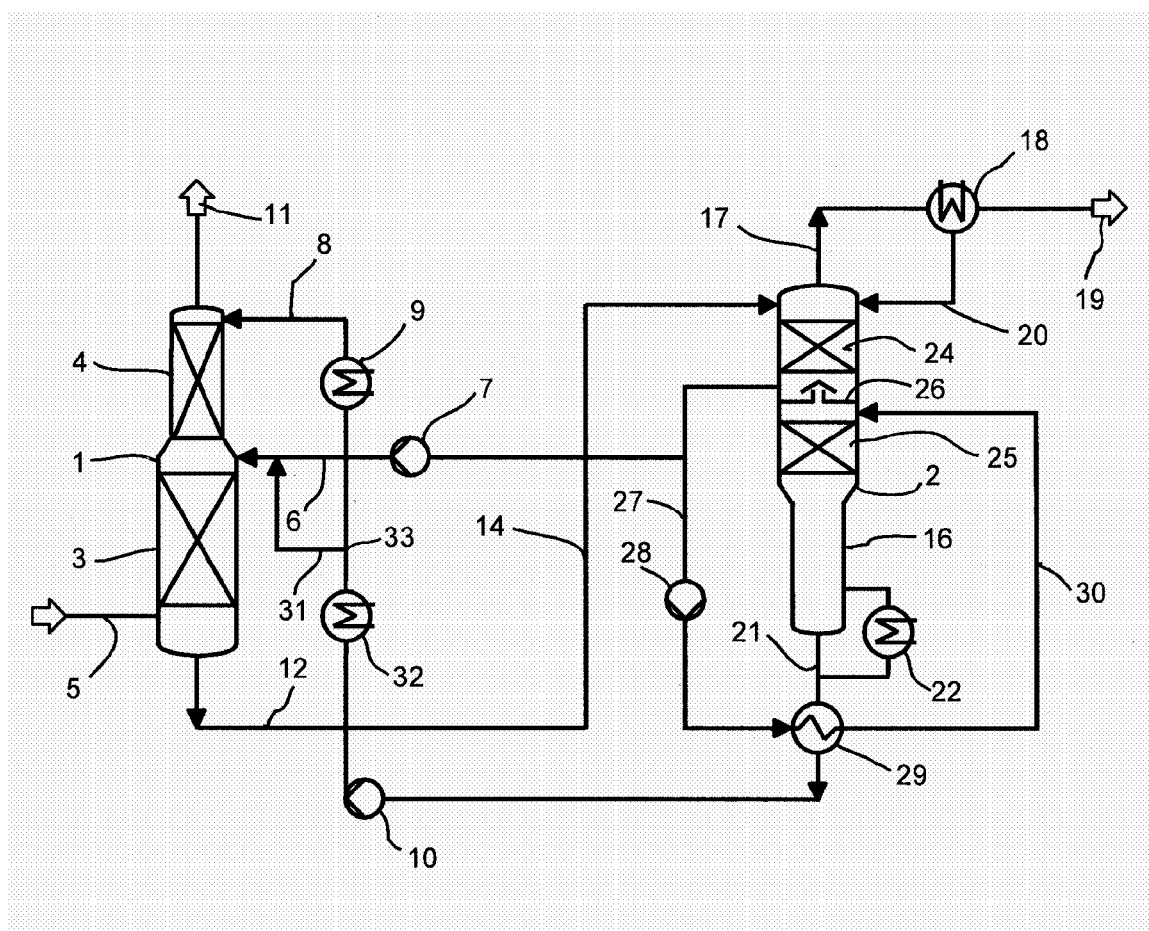

FIG. 2 shows diagrammatically the typical structure of a converted hot pot plant which is suitable for carrying out the process of the invention. The plant has an absorber 1 and a regeneration column 2. The absorber 1 comprises a first absorption zone 3 in the lower part of the absorber 1 and a second absorption zone 4 in the upper part of the absorber 1, the absorber 1 is essentially unchanged compared with the plant of FIG. 1. Via the line 5, the fluid stream to be treated is fed into the absorber 1 and passed in countercurrent flow to the absorption medium in the first absorption zone 3. The absorption medium entering the first absorption zone 3 is composed of partially regenerated absorption medium which is supplied via the line 6 and the pump 7, and regenerated absorption medium which is supplied via the line 31, the distributor 33, the cooler 32 and the pump 10. The fluid stream ascends further into the second absorption zone 4 in which it is passed in countercurrent flow to cooled regenerated absorption medium which is supplied via the line 8, the coolers 9 and 32 and the pump 10. The fluid stream freed from acid gases leaves the absorber 1 via the line 11.

The loaded absorption medium leaves the absorber 1 via the line 12. It passes into the regeneration column 2 and is expanded at a lower pressure. An expansion turbine (which is not shown) can be provided, and the energy obtained can be used to drive the pump 7. The regeneration column 2 comprises a first regeneration zone 24 and a second regeneration zone 25 which are separated from one another by a collection tray 26. Packed beds from the lower part 16 of the regeneration column 2 have been removed. The acid gas released from the absorption medium leaves the regeneration column 2 via the line 17. Entrained absorption medium vapors are condensed in the condenser 18 and recirculated via the line 20 to the regeneration column 2. The acid gas leaves the condenser 18 via the line 19.

A part of the partially regenerated absorption medium which collects on the newly installed collection tray 26 is passed via the pump 7 and line 6 back into the absorber 1. Another part of the partially regenerated absorption medium is passed via the line 27, pump 28, the heat exchanger 29 and the line 30 into the second regeneration zone 2. There it is stripped by ascending vapors and thermally regenerated. The heating of the regeneration column 2 proceeds by absorption medium which is taken off from the bottom of the column via the line 21 and recirculated via the heater or reboiler 22 to the regeneration column 2. Alternative embodiments for the heat exchanger 22 are possible, for example as kettle-type heat exchanger.

Heat is taken off from the regenerated absorption medium in the heat exchanger 29 before it passes via the pump 10 and the cooler 32 back into the absorber 1. The partially regenerated absorption medium is preheated by the heat taken off in the heat exchanger 29, which partially regenerated absorption medium is passed via the line 27, pump 28, the heat exchanger 29 and the line 30 from the first regeneration zone to the second regeneration zone 2. The regenerated absorption medium is divided into two streams in the distributor 33 and in part passed via the line 31 into the first absorption zone 3 and in part via the cooler 9 and the line 8 into the second absorption zone 4 of the absorber 1

EXAMPLE

A synthesis gas stream of 100 000 $Nm^3/h$ having a $CO_2$ content of 21% is to be depleted to a residual $CO_2$ content of 0.2% by volume. Further components in the gas are essentially hydrogen, carbon monoxide and methane. The gas stream is at a pressure of 19 bar and is produced at a temperature of 60° C.

In the table 1 hereinafter, the operating data of a hot potassium carbonate scrubber are shown, and also the operating data which are expected using a conventionally designed amine method and also an amine method according to the invention:

TABLE 1

Comparison of the operating data of a hot pot method, an optimized two-stage amine method and an adaptation according to the invention of the amine method to the structural conditions of the hot pot method

|  |  | Hot pot | Optimized amine method | Adaptation according to the invention of the amine method |
| --- | --- | --- | --- | --- |
| Liquid streams |  |  |  |  |
| Regenerated absorption medium to the second absorption stage | m³/h | 132 | 228 | 132 |
| Regenerated absorption medium to the first absorption stage | m³/h | — | — | 326 |
| Partially regenerated absorption medium to the first absorption stage | m³/h | 809 | 1036 | 455 |
| Loaded absorption medium at the bottom of the absorber | m³/h | 971 | 1340 | 930 |
| Heat transfer performance |  |  |  |  |
| Reboiler | GJ/h | 80.9 | 46.4 | 70.0 |
| Heat exchanger partially regenerated/regenerated absorption medium | GJ/h | — | 28.2 | 40.3 |
| Condenser | GJ/h | 25.3 | 11.7 | 13.1 |
| Cooler for regenerated absorption medium | GJ/h | 11.4 | 30.7 | 53.0 |

Whereas the optimized plant design for amine methods does have the significantly lowest energy requirement of the variants shown, in comparison of the required circulation rates of regenerated and partially regenerated solution it becomes clear that this optimized amine process may not be represented in the former hot pot plant. The circulation rates required in the amine method are considerably higher, as a result of which not only the existing pump performance but also the hydraulic capacity of the columns would be significantly exceeded.

In contrast, in the case of the design according to the invention of the amine method, equal or lower solvent circulation rates result, which makes possible reuse of the existing absorption and regeneration columns and also the continued use of the existing pumps. Although, as described, in this variant a heat exchanger for the heat exchange between partially regenerated absorption medium/regenerated absorption medium and a cooler for the regenerated lye are also to be newly installed, a significantly lower energy requirement (performance of the reboiler) of the amine method of the invention compared with the hot pot method remains.

The invention claimed is:

1. A method for removing acid gases from a fluid stream comprising:
   a) passing the fluid stream, which is in contact with an absorption medium comprising an aqueous solution of at least one amine within an absorber, through a first absorption zone in the absorber, wherein a majority of acid gases are removed from the fluid stream in the first absorption zone, and susequently passing the fluid stream through a second absorption zone in the absorber, wherein a further amount of acid gases are removed from the fluid stream in the second absorption zone;
   b) passing the loaded absorption medium into a first regeneration zone to obtain a partially regenerated absorption medium, and passing a part of the partially regenerated absorption medium into the first absorption zone;
   c) passing the other part of the partially regenerated absorption medium into a second regeneration zone to obtain a regenerated absorption medium;
   d) passing a part of the regenerated absorption medium into the first absorption zone and passing the other part of the regenerated absorption medium into the second absorption zone; and
   e) reheating in which the partially regenerated absorption medium passed from the first regeneration zone into the second regeneration zone by indirect heat exchange with the regenerated absorption medium exiting from the second regeneration zone.

2. The method according to claim 1, further comprising arranging the first regeneration zone above the second regeneration zone in a column and heating the first regeneration zone by ascending vapors from the second regeneration zone.

3. The method according to claim 1, in which the regenerated absorption medium entering the first absorption zone has a temperature of about 40 to 65° C.

4. The method according to claim 1, further comprising apportioning the regenerated absorption medium between the first absorption zone and second absorption zone in a ratio of about 1:1 to 5:1.

5. The method according to claim 4, wherein the regenerated absorption medium is apportioned between the first absorption zone and second absorption zone in a ratio of about 2:1 to 4:1.

6. The method according to claim 1, wherein the partially regenerated absorption medium has a degree of loading of about 50 to 70% and the regenerated absorption medium has a degree of loading of about 2 to 6%.

7. The method according to claim 1, wherein a ratio of a circulation rate of the partially regenerated absorption medium to that of the regenerated absorption medium is about 0.5 to 3.

8. The method according to claim 7, wherein the ratio of the circulation rate of the partially regenerated absorption medium to that of the regenerated absorption medium is about 0.7 to 2.

9. The method according to claim 1, wherein the absorption medium comprises an aqueous solution of monoethanolamine (MEA), methylaminopropylamine (MAPA), piperazine, diethanolamine (DEA), triethanolamine (TEA), diethylethanolamine (DEEA), diisopropylamine (DIPA), aminoethoxyethanol (AEE), dimethylaminopropanol (DIMAP) and methyldiethanolamine (MDEA), methyldiisopropanolamine (MDIPA), 2-amino-1-butanol (2-AB) or mixtures thereof.

10. The method according to claim 9, wherein the absorption medium comprises an aqueous solution of methyldiethanolamine and piperazine.

11. The method according to claim 9, wherein the absorption medium comprises an aqueous solution of methyldiethanolamine and methylaminopropylamine.

12. The method according to claim 9, wherein the absorption medium comprises an aqueous solution of methyldiethanolamine and aminoethoxyethanol.

13. The method according to claim 9, wherein the absorption medium comprises an aqueous solution of methyldiethanolamine and 2-amino-1-butanol.

14. A method for converting a plant for removing acid gases from a fluid stream, the plant comprising
   (i) an absorber having a first absorption zone and a second absorption zone,
   (ii) a regeneration column having an upper part, constructed as an expansion column, and a lower part,
   (iii) a first line for feeding regenerated absorption medium from a bottom of the regeneration column to the second absorption zone,
   (iv) a second line for feeding partially regenerated absorption medium from a lower end of the expansion column to the first absorption zone and
   (v) a third line for feeding loaded absorption medium from the bottom of the absorber to an upper end of the expansion column,
the method comprising inserting a collection tray into the upper part of the expansion column so that the expansion column is divided into a first regeneration zone and a second regeneration zone, and leading the second line from the collection tray to the first absorption zone.

15. The method according to claim 14, wherein the collection tray divides separation stages of the expansion column lying above the collection tray and separation stages lying below the collection tray in the ratio of about 1:10 to 1:3.

16. The method according to claim 14, wherein the lower part of the regeneration column is free from internals.

17. The method according to claim 14, further comprising preheating with a heat exchanger the partially regenerated absorption medium passed from the first regeneration zone to the second regeneration zone by indirect heat exchange with the regenerated absorption medium exiting from the second regeneration zone.

18. The method according to claim 14, further comprising apportioning the regenerated absorption medium between the first and second absorption zones with a distributor.

19. The method according to claim 18, further comprising cooling the regenerated absorption medium using a cooler between the regeneration column and the distributor.

20. The method according to claim 14, further comprising charging the plant with an absorption medium which comprises an aqueous solution of monoethanolamine (MEA), methylaminopropylamine (MAPA), piperazine, diethanolamine (DEA), triethanolamine (TEA), diethylethanolamine (DEEA), diisopropylamine (DIPA), aminoethoxyethanol (AEE), dimethylaminopropanol (DIMAP) and methyldiethanolamine (MDEA), methyldiisopropanolamine (MDIPA), 2-amino-1-butanol (2-AB) or mixtures thereof.

21. The method according to claim 20, wherein the plant is charged with an absorption medium which comprises an aqueous solution of methyldiethanolamine and piperazine.

22. The method according to claim 20, wherein the plant is charged with an absorption medium which comprises an aqueous solution of methyldiethanolamine and methylaminopropylamine.

23. The method according to claim 20, in which the plant is charged with an absorption medium which comprises an aqueous solution of methyldiethanolamine and aminoethoxyethanol.

24. The method according to claim 20, wherein the plant is charged with an absorption medium which comprises an aqueous solution of methyldiethanolamine and 2-amino-1-butanol.

\* \* \* \* \*